(12) United States Patent
Paetzold et al.

(10) Patent No.: US 7,999,086 B2
(45) Date of Patent: Aug. 16, 2011

(54) METHOD OF CONDITIONING AZO PIGMENTS CONTAINING CARBOXYLIC ESTER GROUPS

(75) Inventors: Jens Paetzold, Buerstadt (DE); Carsten Plueg, Muehltal/Niederbeerbach (DE); Frank Alfter, Bad Soden (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/322,260

(22) Filed: Jan. 30, 2009

(65) Prior Publication Data

US 2009/0198045 A1    Aug. 6, 2009

(30) Foreign Application Priority Data

Jan. 31, 2008    (DE) .................. 10 2008 006 859

(51) Int. Cl.
*C07D 263/62* (2006.01)
*C07D 235/04* (2006.01)
*C07D 241/36* (2006.01)
*C07C 245/00* (2006.01)
*C09B 29/00* (2006.01)
*C09B 46/00* (2006.01)
*C09B 27/00* (2006.01)

(52) U.S. Cl. ........ 534/575; 534/742; 534/887; 106/496; 548/316.4; 548/221; 544/349

(58) Field of Classification Search ................ None
See application file for complete search history.

(56) References Cited

U.S. PATENT DOCUMENTS

| 3,954,795 | A | * | 5/1976 | Jackson ................... 540/141 |
| 5,910,577 | A | * | 6/1999 | Metz et al. ............... 534/742 |
| 6,028,178 | A | * | 2/2000 | Metz et al. ............... 534/581 |
| 7,147,703 | B2 | * | 12/2006 | Ganschow et al. ........ 106/493 |
| 7,262,284 | B2 | | 8/2007 | Schupp et al. |
| 7,300,608 | B2 | | 11/2007 | Sunahara et al. |
| 7,311,769 | B2 | * | 12/2007 | Weber et al. ............. 106/494 |
| 2004/0261662 | A1 | | 12/2004 | Grandidier et al. |
| 2006/0167236 | A1 | | 7/2006 | Schupp et al. |
| 2009/0087769 | A1 | * | 4/2009 | Weber et al. ............ 430/108.23 |

FOREIGN PATENT DOCUMENTS

| DE | 10227527 | 1/2004 |
| EP | 0894831 | 2/1999 |

OTHER PUBLICATIONS

USPTO Office Action for U.S. Appl. No. 11/919,661 mailed Jul. 27, 2009.

* cited by examiner

*Primary Examiner* — Kamal Saeed
*Assistant Examiner* — Nyeemah A Grazier
(74) *Attorney, Agent, or Firm* — Anthony A. Bisulca

(57) ABSTRACT

The invention provides a method of conditioning azo pigments containing carboxylic ester groups, using glycol monoalkyl ethers or mixtures of glycols and glycol dialkyl ether.

13 Claims, No Drawings

METHOD OF CONDITIONING AZO PIGMENTS CONTAINING CARBOXYLIC ESTER GROUPS

Numerous pigments are obtained in their synthesis in a crude form which is not directly suitable for any application. Accordingly the crude pigments must be aftertreated in order to set the correct crystal polymorph or particle size distribution or to remove impurities. One established technique for conditioning is the treatment of the crude pigments in solvents. In that case, elevated temperatures are often needed in order to obtain particle size growth.

EP 0 894 831 B1 describes the conditioning of pigments in aprotic dipolar solvents such as dimethylformamide, dioxane, N-methylpyrrolidone or dimethyl sulfoxide. The solvency of these solvents is high, but they are difficult to use on an industrial scale.

DE 102 27 527 A1 describes the treatment of diazo pigments with protic and aprotic solvents at basic or neutral pH. This conditioning method is impracticable for some pigments, since functional groups of the pigment, ester groups in particular, may be attacked by the high pH or the high temperatures. Often, hydrolysis and solvolysis are observed, leading to a reduction in fastness to overcoating in paints and inks, or to increased migration in plastics.

The conditioning of pigments containing carboxylic ester groups by the conventional methods, then, is associated with disadvantages. Especially for azo pigments which contain such ester groups, the customary conditioning methods are not always suitable.

The object was therefore to find suitable solvents for the conditioning of azo pigments containing carboxylic ester groups, without decomposition or degradation reactions on the part of the pigment.

Surprisingly it has been found that, when azo pigments containing carboxylic ester groups are conditioned using glycol monoalkyl ethers or mixtures of glycols and glycol dialkyl ethers and, if desired, glycol monoalkyl ethers, advantageous pigment morphologies are produced, without decomposition or degradation reactions occurring.

The invention accordingly provides a method of conditioning azo pigments containing carboxylic ester groups, which comprises subjecting a crude azo pigment from the group of monoazo, diazo, diazocondensation, naphthol and metal complex pigments, said azo pigment containing carboxylic ester groups including at least one alkoxycarbonyl group located on a terminal phenyl ring, to a treatment with glycol monoalkyl ethers or with mixtures of glycols and glycol dialkyl ethers and, if desired, glycol monoalkyl ethers.

By alkoxycarbonyl group is meant preferably a $C_1$-$C_4$-alkoxy-carbonyl group, more preferably methoxycarbonyl.

Examples of such azo pigments are C.I. Pigment Yellow 120, 155, 175, 182, 213, 219, C.I. Pigment Red 119, 139, 175, 188, 208, 220, 221, and 248.

Preference for the purposes of the invention is given to diazo pigments of the general formula (1) and also to monoazo pigments of the general formula (2)

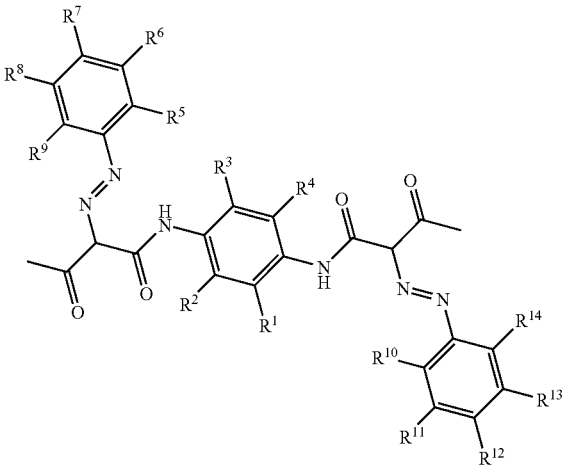

(1)

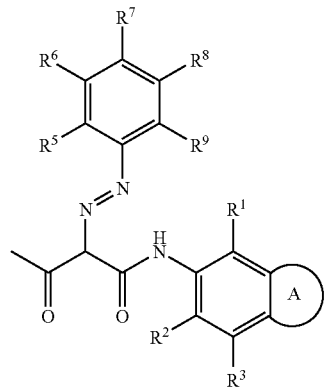

(2)

where $R^1$, $R^2$, $R^3$, and $R^4$ are alike or different and are hydrogen, $C_1$-$C_4$-alkyl, $C_1$-$C_4$-alkoxy, $C_1$-$C_5$-alkoxycarbonyl, nitro, cyano, halogen, phenoxy or trifluoromethyl;

$R^5$, $R^6$, $R^7$, $R^8$, $R^9$, $R^{10}$, $R^{11}$, $R^{12}$, $R^{13}$, and $R^{14}$ are alike or different and are hydrogen, $C_1$-$C_4$-alkyl, $C_1$-$C_4$-alkoxy, nitro, cyano, halogen, phenoxy or trifluoromethyl, COOH, COOR$^{15}$, CONH$_2$, CONCH$_3$, CON(CH$_3$)$_2$ or SO$_2$NR$^{15}$R$^{16}$, where $R^{15}$ is $C_1$-$C_4$-alkyl and $R^{16}$ is hydrogen, $C_1$-$C_4$-alkyl or phenyl, and at least one radical from $R^5$, $R^6$, $R^7$, $R^8$, $R^9$, $R^{10}$, $R^{11}$, $R^{12}$, $R^{13}$ or $R^{14}$ is an ester group —COOR$^{15}$, A is a fused heterocyclic ring in 3,4- or 4,5- or 5,6-position and is constructed from the groups of the general formula (3), (4), (5) or (6):

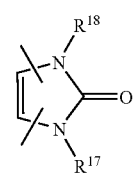

(3)

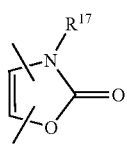

(4)

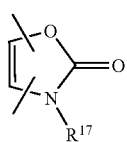

(5)

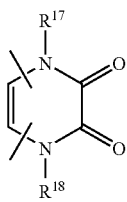

(6)

in which

R$^{17}$ and R$^{18}$ independently of one another are hydrogen, C$_1$-C$_8$-alkyl, C$_5$-C$_6$-cycloalkyl, benzyl, phenyl or naphthyl, it being possible for phenyl and naphthyl to be substituted by one or more of the radicals halogen, nitro, C$_1$-C$_8$-alkyl, C$_5$-C$_6$-cycloalkyl, benzyl, phenyl, naphthyl, COO(C$_1$-C$_6$)alkyl, C$_1$-C$_3$-alkoxy or trifluoromethyl.

Particularly preferred pigments of the formula (1) are symmetrical compounds, i.e., the two terminal phenyl radicals, -phenylR$^5$R$^6$R$^7$R$^8$R$^9$ and -phenylR$^{10}$R$^{11}$R$^{12}$R$^{13}$R$^{14}$, are alike.

The radicals R$^1$, R$^2$, R$^3$, and R$^4$ are preferably hydrogen, C$_1$-C$_4$-alkoxy, methyl or chlorine.

Examples of particularly preferred pigments of the formula (1) are C.I. Pigment Yellow 155 and 219.

Examples of particularly preferred pigments of the formula (2) are C.I. Pigment Yellow 120, 175, and 213.

Examples of particularly preferred naphthol pigments are C.I. Pigment Red 119, 175, 188, and 208.

Examples of particularly preferred diazocondensation pigments are C.I. Pigment Red 220, 221, and 248.

Glycol monoalkyl ethers for the purposes of the present invention are of the general formula (7)

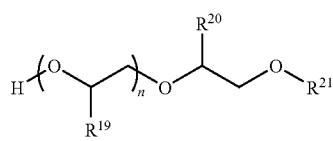

(7)

where n is an integer between 0 and 3, preferably 0 or 1,

R$^{19}$ and R$^{20}$ independently of one another are hydrogen or C$_1$-C$_6$-alkyl, preferably hydrogen or methyl, and R$^{21}$ is C$_1$-C$_6$-alkyl, preferably methyl or ethyl.

Surprisingly it has been found that the conditioning of the invention can also take place in a mixture of a glycol of the general formula (8)

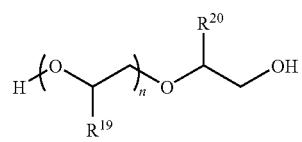

(8)

where n, R$^{19}$, and R$^{20}$ are as defined above, and at least one glycol dialkyl ether of the general formula (9)

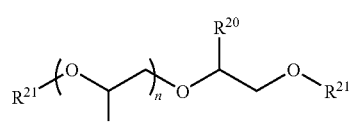

(9)

where n, R$^{19}$, R$^{20}$, and R$^{21}$ are as defined above.

The mixing ratio of the glycols and glycol dialkyl ethers may be arbitrary, provided each component is present at not less than 0.1% by weight, preferably 1% by weight. Particularly preferred solvent mixtures are those containing the glycol and glycol dialkyl ether components in a ratio of 70:30 to 30:70, very preferably in a ratio of 60:40 to 40:60.

Particularly preferred solvents for the conditioning of the invention are 2(2-methoxyethoxy)ethanol, 2(2-ethoxyethoxy)ethanol, 2-butoxyethanol, a mixture of diethylene glycol and diethylene glycol dimethyl ether, more particularly in a weight ratio of approximately 1:1, and also a mixture of diethylene glycol and diethylene glycol diethyl ether, more particularly in a weight ratio of approximately 1:1.

The conditioning can be carried out with a concentration of crude pigment in the solvent that is such as to ensure sufficient stirrability. In general the concentration of crude pigment in the suspension is between 0.5% and 30%, preferably between 1% and 20%, more preferably between 3% and 15% by weight.

The method of the invention is carried out advantageously without addition of water and without basic additives. The glycols and glycol ethers used in the method of the invention may still contain residues of water, which, however, account for a water content of below 5% by weight in the total liquid phase for the conditioning.

The conditioning method of the invention is carried out advantageously in a heatable vessel with stirrer. The preferred temperature range for the conditioning is between 30 and 200° C., more particularly between 80 and 200° C. The duration of the conditioning can vary within wide limits, with 10 minutes to 10 hours being advantageous and 30 minutes to 6 hours being preferred.

After the end of the conditioning, the organic solvent may be separated off in part or in whole, where appropriate by distillation under atmospheric pressure or under reduced pressure, or the pigment suspension is filtered directly, the pigment is washed solvent-free with water, dried by customary methods, and ground if appropriate.

The pigments obtained by the conditioning of the invention exhibit high purities and excellent coloristic and performance properties.

In accordance with the method described it has not been possible to observe any decomposition reactions. This has

EXAMPLE 1 mol of dimethyl aminoterephthalate hydrochloride is diazotized with sodium nitrite at 0 to 10° C. The clarified diazonium salt solution is added dropwise at room temperature over 1 hour to an acetate-buffered suspension of 0.1 mol of N-acetoacetyl-6-methoxy-7-aminoquinoxaline-2,3-dione. As soon as coupling is at an end, the suspension is heated to 95° C. and filtered and the crude product is washed salt-free and dried. The crude pigment is suspended in a liter of 2-(2-methoxyethoxy)ethanol and then stirred at 120 to 180° C. for four hours.

The suspension is then cooled to 70° C. and filtered and the product is dried and ground. This gives 48 g of a greenish yellow pigment having excellent fastness to solvents and to overcoating.

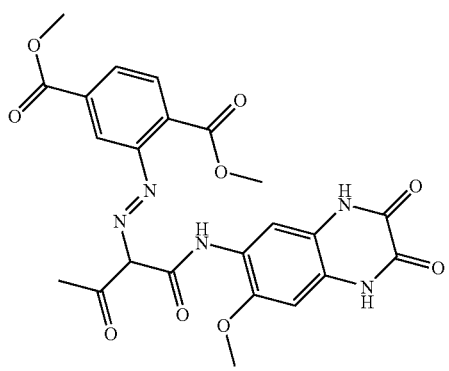

EXAMPLE 2

The crude pigment was prepared in the same way as in example 1, but was conditioned in a liter of 2-(2-ethoxyethoxy)ethanol. This gives 49 g of a yellow pigment having properties comparable with those described in example 1.

EXAMPLE 3

The crude pigment was prepared in the same way as in example 1, but was conditioned in a liter of a 50:50 mixture of diethylene glycol and diethylene glycol dimethyl ether. This gives a pigment having properties comparable with those described in example 1.

EXAMPLE 4

The crude pigment was prepared in the same way as in example 1, but was conditioned in a liter of a 50:50 mixture of diethylene glycol and diethylene glycol diethyl ether. This gives a pigment having properties comparable with those described in example 2.

EXAMPLE 5

The crude pigment was prepared in the same way as in example 1, but using a liter of 2-butoxyethanol for the conditioning. This gives 48 g of a greenish yellow pigment having excellent fastness to solvents and very high fastness to overcoating.

EXAMPLE 6 mol of dimethyl aminoterephthalate hydrochloride is diazotized with sodium nitrite at 0 to 10° C. The clarified diazonium salt solution is admixed dropwise at room temperature over 1 hour with an acetate-buffered suspension of 0.05 mol of 1,4-bisacetoacetylphenylenediamine. As soon as coupling is at an end, the suspension is heated to 95° C. and filtered and the crude product is washed salt-free and dried. The crude pigment is suspended in a liter of 2-(2-ethoxyethoxy)ethanol and then stirred at 100 to 180° C. for one hour.

The suspension is then cooled to 70° C. and filtered and the product is dried and ground. This gives 32 g of a yellow pigment having very good fastness to solvents and high fastness to overcoating.

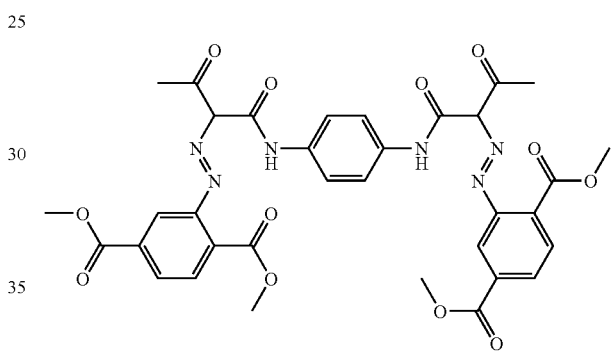

EXAMPLE 7

The pigment is prepared as described in example 6 and stirred in a liter of a 50:50 mixture of diethylene glycol and diethylene glycol diethyl ether at 100 to 180° C. for one hour. This gives a pigment having properties comparable with those described in example 6.

EXAMPLE 8 mol of dimethyl aminoterephthalate hydrochloride is diazotized with sodium nitrite at 0 to 10° C. The clarified diazonium salt solution is admixed dropwise at room temperature over 1 hour with an acetate-buffered suspension of 0.05 mol of 2-chloro-1,4-bis(acetoacetyl)phenylenediamine. As soon as coupling is at an end, the suspension is heated to 95° C. and filtered and the crude product is washed salt-free and dried. The crude pigment is suspended in a liter of 2-(2-methoxyethoxy)ethanol and then stirred at 120 to 180° C. for one hour.

The suspension is then cooled to 70° C. and filtered and the product is dried and ground. This gives 29 g of a greenish yellow pigment having excellent fastness to solvents and to overcoating.

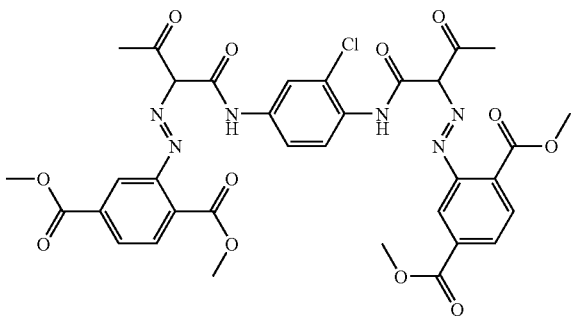

EXAMPLE 9

The crude pigment was prepared in the same way as in example 8, but using a liter of 2-butoxyethanol for the conditioning. This gives 30 g of a yellow pigment having excellent fastness to solvents and very high fastness to overcoating.

EXAMPLE 10

The crude pigment was prepared in the same way as in example 8, but using a liter of 2-(2-ethoxyethoxy)ethanol for the conditioning. This gives 30 g of a yellow pigment having excellent fastness to solvents and very high fastness to overcoating.

EXAMPLE 11

The pigment is prepared as described in example 8 and stirred in a liter of a 50:50 mixture of diethylene glycol and diethylene glycol dimethyl ether at 100 to 180° C. for one hour. This gives a pigment having properties comparable with those described in example 8.

EXAMPLE 12

The pigment is prepared as described in example 8 and stirred in a liter of a 50:50 mixture of diethylene glycol and diethylene glycol diethyl ether at 100 to 180° C. for one hour. This gives a pigment having properties comparable with those described in example 10.

EXAMPLE 13 mol of dimethyl aminoterephthalate hydrochloride is diazotized with sodium nitrite at 0 to 10° C. The clarified diazonium salt solution is added dropwise at room temperature over 1 hour to an acetate-buffered suspension of 0.1 mol of N-acetoacetyl-4-amino-1,2-benzimidazolone. As soon as coupling is at an end, the suspension is heated to 95° C. and filtered and the crude product is washed salt-free and dried. The crude pigment is suspended in a liter of 2-(2-ethoxyethoxy)ethanol and then stirred at 80 to 120° C. for three hours.

The suspension is then cooled to 70° C. and filtered and the product is dried and ground. This gives 40 g of a neutrally yellow pigment having very high fastness to solvents and to overcoating.

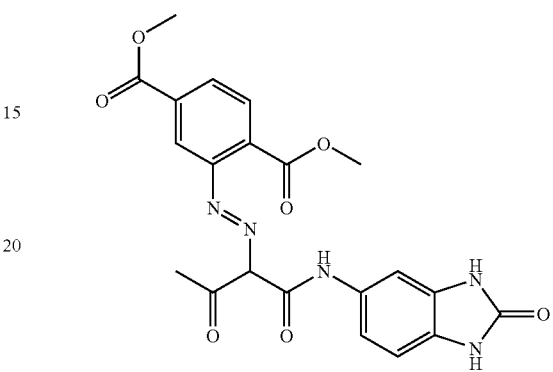

Evaluation of the fastness to overcoating and fastness to solvents:

The fastness to overcoating was evaluated in a white nitro combination varnish and a white baking varnish at 120° C. and 160° C. for 30 minutes against a gray scale of 1-5 in accordance with the standard DIN EN 20105-A03.

The fastness to solvents was evaluated by the same gray scale in accordance with DIN EN 20105-A03.

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Fastness to overcoating | 5 | 5 | 5 | 5 | 5 | 5 | 5 | 5 | 5 | 5 | 5 | 5 | 4-5 |
| Fastness to solvents | 5 | 5 | 5 | 5 | 5 | 4-5 | 4-5 | 5 | 5 | 5 | 5 | 5 | 4-5 |

What is claimed is:

1. A method of conditioning an azo pigment containing carboxylic ester groups, comprising the step of subjecting a crude azo pigment, wherein the crude azo pigment contains carboxylic ester groups, to a treatment with glycol monoalkyl ethers or with mixtures of glycols and glycol dialkyl ethers and, optionally, glycol monoalkyl ethers and wherein the crude azo pigment containing carboxylic ester groups is a pigment selected from the group consisting of C.I. Pigment Yellow, 182, C.I. Pigment Red 119, 139, 175, 188, 208, 220, 221, 248, a diazo pigment of the general formula (1)

(1)

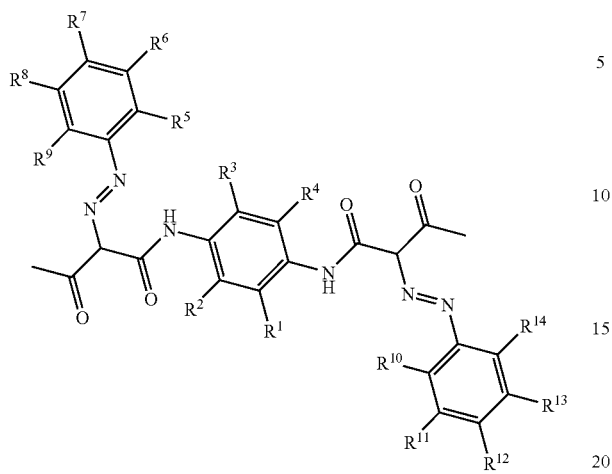

where
R$^1$, R$^2$, R$^3$, and R$^4$ are identical or different and are hydrogen, C$_1$-C$_4$-alkyl, C$_1$-C$_4$-alkoxy, C$_1$-C$_5$-alkoxycarbonyl, nitro, cyano, halogen, phenoxy or trifluoromethyl;
R$^5$, R$^6$, R$^7$, R$^8$, R$^9$, R$^{10}$, R$^{11}$, R$^{12}$, R$^{13}$, and R$^{14}$ are identical or different and are hydrogen, C$_1$-C$_4$-alkyl, C$_1$-C$_4$-alkoxy, nitro, cyano, halogen, phenoxy, trifluoromethyl, COOH, COOR$^{15}$, CONH$_2$, CONCH$_3$, CON(CH$_3$)$_2$ or SO$_2$NR$^{15}$R$^{16}$, where
R$^{15}$ is C$_1$-C$_4$-alkyl and R$^{16}$ is hydrogen, C$_1$-C$_4$-alkyl or phenyl,
and at least one radical from R$^5$, R$^6$, R$^7$, R$^8$, R$^9$, R$^{10}$, R$^{11}$, R$^{12}$, R$^{13}$ or R$^{14}$ is an ester group —COOR$^{15}$; and a monoazo pigment of the general formula (2)

(2)

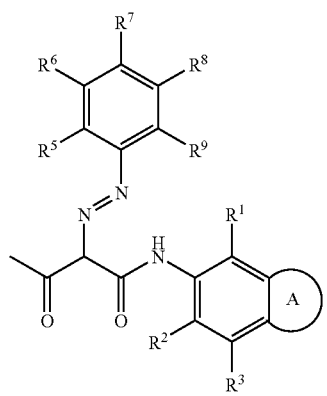

where
R$^1$, R$^2$, and R$^3$ are identical or different and are hydrogen, C$_1$-C$_4$-alkyl, C$_1$-C$_4$-alkoxy, C$_1$-C$_5$-alkoxycarbonyl, nitro, cyano, halogen, phenoxy or trifluoromethyl;
R$^5$, R$^6$, R$^7$, R$^8$, and R$^9$ are identical or different and are hydrogen, C$_1$-C$_4$-alkyl, C$_1$-C$_4$-alkoxy, nitro, cyano, halogen, phenoxy or trifluoromethyl, COOH, COOR$^{15}$, CONH$_2$, CONCH$_3$, CON(CH$_3$)$_2$ or SO$_2$NR$^{15}$R$^{16}$, where
R$^{15}$ is C$_1$-C$_4$-alkyl and
R$^{16}$ is hydrogen, C$_1$-C$_4$-alkyl or phenyl,
and at least one radical from R$^5$, R$^6$, R$^7$, R$^8$, and R$^9$ is an ester group —COOR$^{15}$, A is a fused heterocyclic ring in 3,4- or 4,5- or 5,6-position and is constructed from the groups of the general formula (3), (4), (5) or (6):

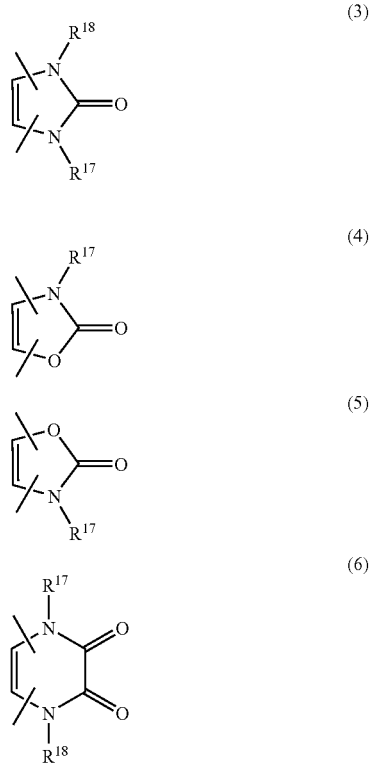

where
R$^{17}$ and R$^{18}$ independently of one another are hydrogen, C$_1$-C$_8$-alkyl, C$_5$-C$_6$-cycloalkyl, benzyl, phenyl or naphthyl, wherein, optionally, the phenyl and naphthyl are substituted by one or more of the radicals halogen, nitro, C$_1$-C$_8$-alkyl, C$_5$-C$_6$-cycloalkyl, benzyl, phenyl, naphthyl, COO(C$_1$-C$_6$)alkyl, C$_1$-C$_3$-alkoxy or trifluoromethyl.

2. The method as claimed in claim 1, wherein the subjecting step is carried out in the presence of glycol monoalkyl ethers of the general formula (7)

(7)

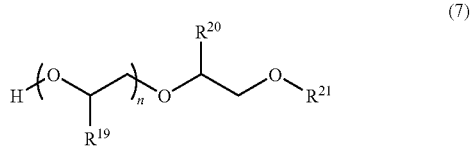

where
n is an integer between 0 and 3,
R$^{19}$ and R$^{20}$ independently of one another are hydrogen or C$_1$-C$_6$-alkyl; and
R$^{21}$ is C$_1$-C$_6$-alkyl.

3. The method as claimed in claim 1, wherein the subjecting step takes place in a mixture of a glycol of the general formula (8)

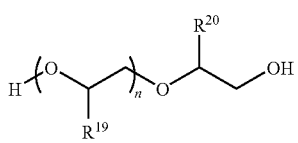

(8)

where
- n is an integer between 0 and 3 and
- $R^{19}$ and $R^{20}$ independently of one another are hydrogen or $C_1$-$C_6$-alkyl, and a glycol dialkyl ether of the general formula (9)

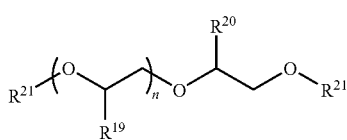

(9)

where
- n is an integer between 0 and 3,
- $R^{19}$ and $R^{20}$ independently of one another are hydrogen or $C_1$-$C_6$-alkyl; and
- $R^{21}$ is $C_1$-$C_6$-alkyl.

4. The method as claimed in claim 1, wherein the subjecting step is carried out in a temperature range between 30 and 200° C.

5. The method as claimed in claim 1, wherein the subjecting step is carried out in 2(2-methoxyethoxy)ethanol, 2(2-ethoxyethoxy)ethanol, 2-butoxyethanol, a mixture of diethylene glycol and diethylene glycol dimethyl ether or a mixture of diethylene glycol and diethylene glycol diethyl ether.

6. A method of conditioning an azo pigment containing carboxylic ester groups, comprising the step of subjecting a crude azo pigment, wherein the crude azo pigment contains carboxylic ester groups, to a treatment with glycol monoalkyl ethers or with mixtures of glycols and glycol dialkyl ethers and, optionally, glycol monoalkyl ethers and wherein the crude azo pigment containing carboxylic ester groups is a pigment selected from the group consisting of C.I. Pigment Yellow 155, and 219.

7. A method of conditioning an azo pigment containing carboxylic ester groups, comprising the step of subjecting a crude azo pigment, wherein the crude azo pigment contains carboxylic ester groups, to a treatment with glycol monoalkyl ethers or with mixtures of glycols and glycol dialkyl ethers and, optionally, glycol monoalkyl ethers and wherein the crude azo pigment containing carboxylic ester groups is a pigment selected from the group consisting of C.I. Pigment Yellow 120, 175 and 213.

8. The method as claimed in claim 1, wherein the crude azo pigment includes at least one alkoxycarbonyl group located on a terminal phenyl ring.

9. The method as claimed in claim 6, wherein the crude azo pigment includes at least one alkoxycarbonyl group located on a terminal phenyl ring.

10. The method as claimed in claim 7, wherein the crude azo pigment includes at least one alkoxycarbonyl group located on a terminal phenyl ring.

11. The method as claimed in claim 8, wherein the alkoxycarbonyl group is a $C_1$-$C_4$-alkoxy-carbonyl group.

12. The method as claimed in claim 9, wherein the alkoxycarbonyl group is a $C_1$-$C_4$-alkoxy-carbonyl group.

13. The method as claimed in claim 1, wherein the alkoxycarbonyl group is a $C_1$-$C_4$-alkoxy-carbonyl group.

* * * * *